United States Patent
Wang et al.

(10) Patent No.: US 10,289,431 B2
(45) Date of Patent: May 14, 2019

(54) TECHNOLOGIES FOR REDUCED CONTROL AND STATUS REGISTER ACCESS LATENCY

(71) Applicant: Intel Corporation, Santa Clara, CA (US)

(72) Inventors: Xueyan Wang, Lacey, WA (US); Wenjuan Mao, Shanghai (CN); Qiang Li, Shanghai (CN); John V. Lovelace, Irmo, SC (US); James R. Goffena, Columbia, SC (US)

(73) Assignee: INTEL Corporation, Santa Clara, CA (US)

( * ) Notice: Subject to any disclaimer, the term of this patent is extended or adjusted under 35 U.S.C. 154(b) by 273 days.

(21) Appl. No.: 15/283,318

(22) Filed: Oct. 1, 2016

(65) Prior Publication Data

US 2018/0095889 A1 Apr. 5, 2018

(51) Int. Cl.
*G06F 9/445* (2018.01)
*G06F 13/00* (2006.01)
*G06F 12/0875* (2016.01)

(52) U.S. Cl.
CPC .......... *G06F 9/44505* (2013.01); *G06F 13/00* (2013.01); *G06F 12/0875* (2013.01); *G06F 2212/452* (2013.01)

(58) Field of Classification Search
CPC .. G06F 12/0875; G06F 12/0895; G06F 12/10; G06F 9/44505; G06F 2212/60
USPC ........................................................ 711/141
See application file for complete search history.

(56) References Cited

U.S. PATENT DOCUMENTS

| | | | | |
|---|---|---|---|---|
| 6,131,143 A * | 10/2000 | Sakai | .................. | G06F 12/0864 711/128 |
| 6,493,797 B1 * | 12/2002 | Lee | ...................... | G06F 9/3802 711/118 |
| 6,581,140 B1 * | 6/2003 | Sullivan | .............. | G06F 12/0864 711/128 |
| 2011/0022773 A1 * | 1/2011 | Rajamony | ............. | G06F 12/084 711/3 |
| 2011/0106981 A1 * | 5/2011 | Watkins | .............. | G06F 13/4221 710/9 |
| 2014/0244965 A1 * | 8/2014 | Manula | ............... | G06F 12/1081 711/206 |
| 2017/0124018 A1 * | 5/2017 | Li | .......................... | G06F 13/24 |

\* cited by examiner

*Primary Examiner* — Reginald G Bragdon
*Assistant Examiner* — Aaron D Ho
(74) *Attorney, Agent, or Firm* — Barnes & Thornburg LLP

(57) ABSTRACT

Technologies for control and status register (CSR) access include a computing device that starts a firmware initialization phase. The firmware accesses a CSR at an abstract CSR address. The computing device determines whether an upper part of the CSR address matches a cached upper part of a previously accessed CSR address. If the upper parts do not match, the computing device converts the CSR address into a physical address and caches the upper part of the CSR address and the upper part of the physical address. If the upper parts match, the computing device combines a cached upper part of a previously accessed physical address with an offset of the CSR address. The upper part may include 20 bits and the lower part may include 12 bits. The physical address may be a PCIe address of the CSR added with an MMCFG base address. Other embodiments are described and claimed.

23 Claims, 3 Drawing Sheets

TECHNOLOGIES FOR REDUCED CONTROL AND STATUS REGISTER ACCESS LATENCY

BACKGROUND

Typical computing platforms initialize and configure platform hardware such as processors, I/O subsystems, and other computer chips during a pre-boot firmware initialization phase. In particular, during platform initialization the platform firmware may access multiple control and status registers (CSRs) associated with the platform hardware. Platform firmware for typical systems may perform several million CSR accesses during a boot cycle. Thus, CSR access latency may have a significant effect on boot performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
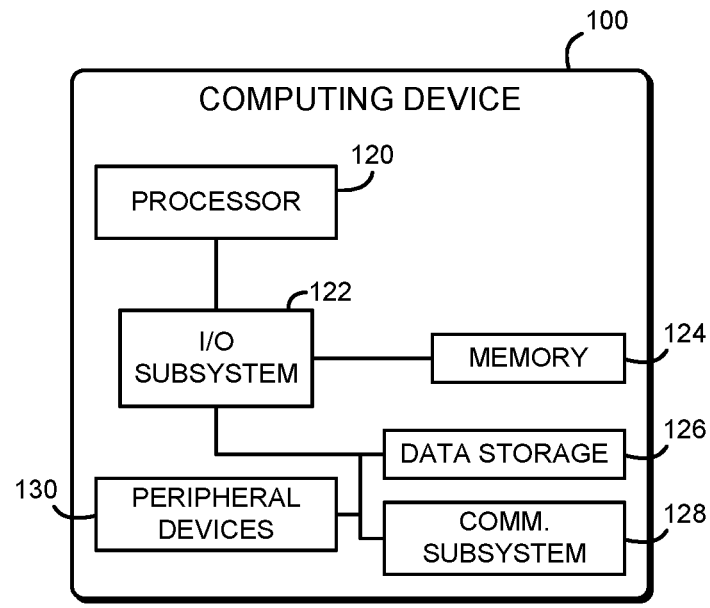
FIG. 1 is a simplified block diagram of at least one embodiment of a computing device for reduced CSR access latency.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 may support reduced control and status register (CSR) access latency. In use, as described further below, the computing device 100 accesses a CSR using an abstract CSR address during a firmware initialization phase. The computing device 100 converts the abstract CSR address into a physical address and caches the upper parts of both the abstract CSR address and the physical address. The computing device 100 may re-use the cached upper part of the physical address for subsequent accesses to CSRs of the same category. By re-using the cached upper part, the computing device 100 may avoid latency associated with converting the abstract CSR address to the physical address for subsequent accesses. Because firmware initialization typically accesses many CSRs of the same category, the computing device 100 may re-use the cached upper part for most CSR accesses (e.g., for over 90% of accesses in certain embodiments) and thereby substantially improve performance of the firmware initialization phase. For example, Table 1, below, illustrates latency improvements that may be achieved by the computing device 100. Table 1 shows the average latency (in nanoseconds) of a single CSR access, as calculated by averaging the latency of 1 million individual accesses on a single-socket system for various CSR categories, both without caching enabled and with caching enabled. As shown, enabling caching as performed by the computing device 100 may substantially reduce average access latency.

TABLE 1

Average CSR access latency per CSR category (in nanoseconds).

| CSR Category | Caching Disabled | Caching Enabled |
| --- | --- | --- |
| MC0 Read | 698 | 372 |
| MC0 Write | 712 | 379 |
| MC1 Read | 756 | 428 |
| MC1 Write | 773 | 437 |
| CH0 Read | 730 | 404 |
| CH0 Write | 749 | 416 |
| CH1 Read | 706 | 379 |
| CH1 Write | 711 | 378 |
| CH2 Read | 721 | 394 |
| CH2 Write | 735 | 401 |
| CH3 Read | 790 | 462 |

TABLE 1-continued

Average CSR access latency per CSR category (in nanoseconds).

| CSR Category | Caching Disabled | Caching Enabled |
|---|---|---|
| CH3 Write | 813 | 480 |
| CH4 Read | 761 | 434 |
| CH4 Write | 768 | 435 |
| CH5 Read | 780 | 453 |
| CH5 Write | 801 | 467 |

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or other peripheral devices.

Figure 2:
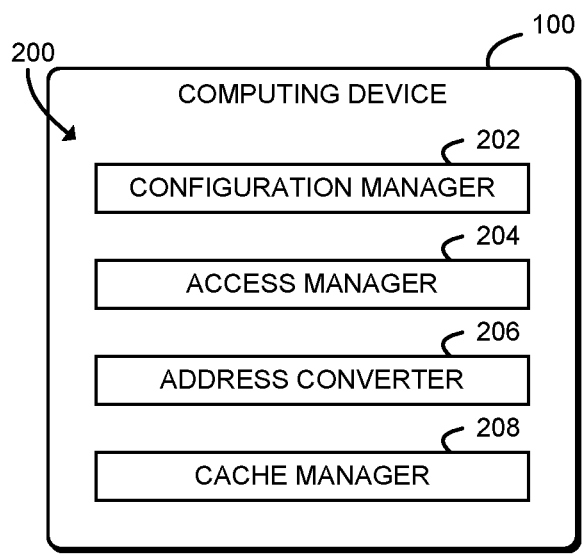
FIG. 2 is a simplified block diagram of an environment that may be established by a computing device of FIG. 1.

Referring now to FIG. 2, in an illustrative embodiment, the computing device 100 establishes an environment 200 during operation. The illustrative environment 200 includes configuration manager 202, an access manager 204, an address converter 206, and a cache manager 208. The various components of the environment 200 may be embodied as hardware, firmware, software, or a combination thereof. As such, in some embodiments, one or more of the components of the environment 200 may be embodied as circuitry or collection of electrical devices (e.g., configuration manager circuitry 202, access manager circuitry 204, address converter circuitry 206, and/or cache manager circuitry 208). It should be appreciated that, in such embodiments, one or more of the configuration manager circuitry 202, the access manager circuitry 204, the address converter circuitry 206, and/or the cache manager circuitry 208 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The configuration manager 202 is configured to start a firmware initialization phase for the computing device 100. For example, the configuration manager 202 may be configured to execute a pre-boot firmware environment such as a unified extensible firmware interface (UEFI) environment. The configuration manager 202 may be further configured to access one or more control and status registers (CSRs) of the computing device 100. Each CSR may be embodied as a configuration register of a hardware component of the computing device 100. Each CSR is accessed at a corresponding CSR address, which may include a 20-bit upper part and a 12-bit CSR offset. The upper part of each CSR address may be associated with a CSR register category.

The access manager 204 is configured to determine, in response to a CSR access, whether the upper part of the corresponding CSR address matches a cached upper part of a previous CSR address. The access manager 204 is further configured to access the CSR at a physical address determined as described below. The CSR may be accessed by performing a memory-mapped I/O operation at the physical address.

The address converter 206 is configured to, in response to determining that the upper part of a current CSR address does not match the cached upper part of the previous CSR address, convert the current CSR address into a physical address of the corresponding CSR. The physical address may include a 20-bit upper part and a 12-bit physical offset. The 12-bit physical offset matches the 12-bit CSR offset of the CSR address. The physical address may be determined by generating a PCIe address associated with the CSR and adding the PCIe address to a memory mapped configuration (MMCFG) base address. The address converter 206 is further configured to cache the upper part of the current CSR address in the cached upper part of the previous CSR address and to cache an upper part of the physical address in a cached upper part of a previous physical address.

The cache manager 208 is configured to, in response to determining that the upper part of the current CSR address matches the cached upper part of the previous CSR address, combine the cached upper part of the previous physical address and the CSR offset of the current CSR address to generate the physical address.

Figure 3:
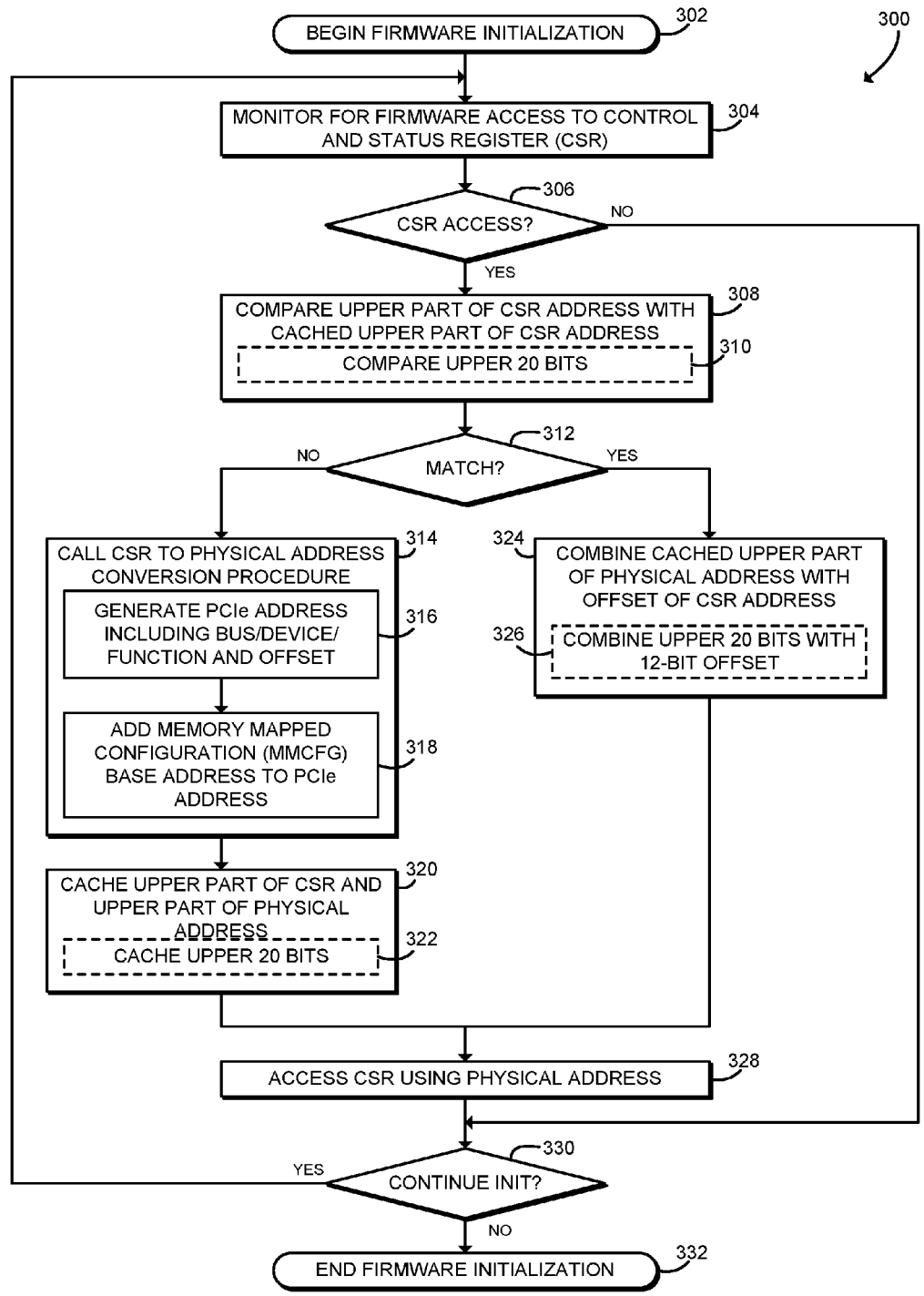
FIG. 3 is a simplified flow diagram of at least one embodiment of a method for reduced CSR access latency that may be executed by a computing device of FIGS. 1-2.

Referring now to FIG. 3, in use, the computing device 100 may execute a method 300 for accessing control and status registers (CSRs) with reduced latency. It should be appreciated that, in some embodiments, the operations of the method 300 may be performed by one or more components of the environment 200 of the computing device 100 as shown in FIG. 2. The method 300 begins in block 302, in which the computing device 100 begins a firmware initialization phase. For example, the computing device 100 may load and execute a pre-boot firmware environment such as a unified extensible firmware interface (UEFI) environment. During the firmware initialization phase, the computing device 100 initializes and configures various hardware components of the computing device 100 such as the processor 120, the I/O subsystem 122, and/or other controllers and integrated circuit components.

In block 304, the computing device 100 monitors for firmware access to a control and status register (CSR). The firmware accesses the CSR through an abstracted CSR address, which may be embodied as a 32-bit address loaded from the firmware. As described further below, the abstracted CSR address maps to a physical address of the CSR. The particular physical address of each CSR may vary, for example, between hardware revisions of the particular hardware component being initialized. In block 306, the computing device 100 determines whether a CSR access has occurred. If not, the method 300 branches ahead to block 330, described below. If a CSR access has occurred, the method 300 advances to block 308.

In block 308, the computing device 100 compares the upper part of the abstract CSR address with a cached upper part of a previous CSR address. Accesses to CSRs in the same category use abstract CSR addresses with the same upper part. As described further below, the computing device 100 may cache the upper part of the previously accessed abstract CSR address. Thus, the upper part of the current CSR address may match the cached upper part when the firmware sequentially accesses multiple CSRs from the came category. Similarly, the upper part of the current CSR address may not match the cached upper part when the firmware accesses CSRs in different categories. In some embodiments, in block 310 the computing device 100 may compare the upper 20 bits of the abstract CSR address with the cached upper 20 bits of the previously accessed CSR address.

In block 312, the computing device 100 determines whether the upper part of the current CSR address matches the cached upper part of the previously accessed CSR address. If so, the method 300 branches to block 324, described below. If the upper parts do not match, the method 300 branches to block 314. Also, if no cached upper part of the previously accessed CSR address exists (e.g., if no CSR has been previously accessed), the method 300 may branch to block 314.

In block 314, the computing device 100 calls a CSR to physical address conversion procedure. The conversion procedure converts the abstract CSR address into a physical address that may be accessed, for example, using one or more memory-mapped I/O operations. In block 316, the computing device 100 generates a PCIe address for the CSR register. The PCIe address includes a bus/device/function identifier as well as an offset. The offset of the PCIe address is the same as the lower part (i.e., offset) of the abstract CSR address. For example, in some embodiments the PCIe address may include an 8-bit bus identifier, a 5-bit device identifier, a 3-bit function identifier, and a 12-bit offset. In block 318, the computing device 100 adds the PCIe address to a memory mapped configuration (MMCFG) base address to generate the physical address. The MMCFG base address may be embodied as a memory address that identifies the start of a memory mapped configuration space established by the computing device 100. For example, the MMCFG may be embodied as a page-aligned 32-bit address. Thus, the physical address may be embodied as a 32-bit memory address that may be used to access the CSR using one or more memory mapped I/O instructions or other memory access instructions.

In block 320, the computing device 100 caches the upper part of the abstract CSR address and the upper part of the physical address. The computing device 100 may cache the upper parts in any volatile or non-volatile memory of the computing device 100 that is accessible by the firmware. For example, the computing device 100 may cache those values in one or more local variables, global variables, firmware variables, and/or other storage locations. In some embodiments, in block 322, the computing device 100 may cache the upper 20 bits of the abstract CSR and the physical address. Additionally, although described as caching the upper parts of the CSR address and the physical address, it should be understood that in some embodiments the computing device 100 may cache the entire abstract CSR address and/or physical address. After caching the upper parts of the abstract CSR address and the physical address, the method 300 advances to block 328, described below.

Referring back to block 312, if the upper part of the current CSR address matches the cached upper part of the previous CSR address, the method 300 branches to block 324. In block 324, the computing device 100 combines the cached upper part of the previous physical address with the offset (i.e., the lower part) of the current CSR address. As described above in connection with block 320, the upper part of the physical address is cached during the previous CSR access. The upper part of the physical address may be cached in any volatile or non-volatile memory of the computing device 100 that is accessible by the firmware. The computing device 100 may combine the upper part of the physical address and the offset of the CSR address by, for example, concatenating the two values, XORing the two values, or otherwise combining the two values to produce a physical address. Thus, the computing device 100 does not need to call the conversion procedure or otherwise convert the CSR address into the physical address. In some embodiments, in block 326 the computing device 100 may combine the cached upper 20 bits of the previous physical address with the 12-bit offset of the current CSR address to generate a 32-bit physical address. After generating the physical address, the method 300 advances to block 328.

In block 328, the computing device 100 accesses the CSR using the physical address generated as described above in connection with block 314 or block 324. To access the CSR, the computing device 100 may perform one or more memory mapped I/O instructions or other accesses to a configuration space established by the computing device 100.

In block 330, the computing device 100 determines whether to continue firmware initialization. The computing device 100 may continue firmware initialization until control is passed to an operating system or other runtime environment of the computing device 100. For example, the computing device 100 may continue executing a UEFI pre-boot firmware environment until an ExitBootServices( ) function is called. If the computing device 100 determines to continue firmware initialization, the method 300 loops back to block 304 to continue monitoring for firmware access to CSRs. If the computing device 100 determines to stop firmware initialization, the method 300 branches to block 332, in which the firmware initialization phase ends and the method 300 is completed. As described above, after ending firmware initialization, the computing device 100 may pass control to or otherwise launch an operating system or other runtime environment of the computing device 100.

Although illustrated as accessing CSRs during a firmware initialization phase, it should be understood that in some embodiments the computing device 100 may access CSRs as described in FIG. 3 during other execution phases. For example, the computing device 100 may access CSRs during execution of an operating system (e.g. during driver initialization) or in any other operational phase in which CSRs are configured.

Figure 4:
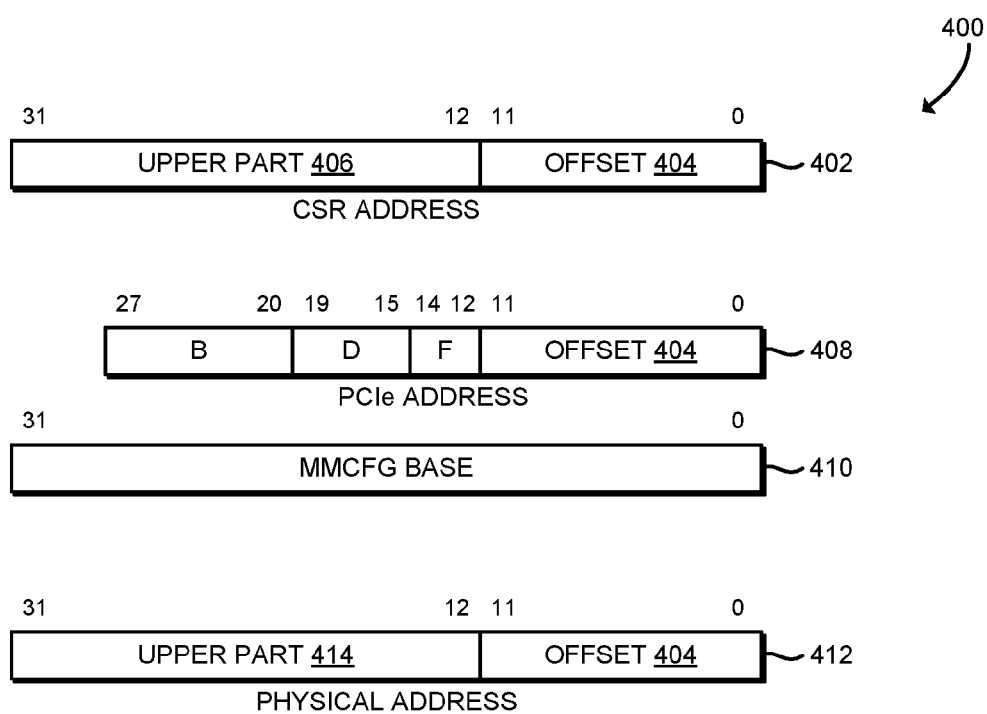
FIG. 4 is a schematic diagram of various CSR addresses that may be determined by the computing device of FIGS. 1-2.

Referring now to FIG. 4, diagram 400 illustrates various addresses that may be generated by the computing device 100 in an illustrative embodiment. In particular, the diagram 400 illustrates an abstract CSR address 402, a PCIe address 408, an MMCFG base address 410, and a physical address 412. The illustrative CSR address 402 is embodied as a 32-bit address including a 20-bit upper part 406 and a 12-bit offset 404. The PCIe address 408 also includes the 12-bit offset 404, as well as an 8-bit bus identifier, a 5-bit device identifier, and a 3-bit function identifier. The MMCFG base address 410 is illustratively a 32-bit address. The physical address 412 includes an upper part 414 and the offset 404.

As described above in connection with block 314 of FIG. 3, the computing device 100 may convert a CSR address 402 into a physical address 412 by generating a PCIe address 408 for the CSR address 402 and then adding that PCIe address 408 to the MMCFG base address 410. As described above in connection with block 320 of FIG. 3, the computing device 100 may cache the upper part 406 of the CSR address 402 as well as the upper part 414 of the physical address 412 for use in a subsequent CSR access. As described above in connection with block 324 of FIG. 3, the computing device 100 may combine the cached upper part 414 of a previous physical address 412 with the offset 404 of the current CSR address 402 to generate a physical address 412 for the current CSR.

It should be appreciated that, in some embodiments, the method 300 may be embodied as various instructions stored on a computer-readable media, which may be executed by the processor 120, the I/O subsystem 122, and/or other components of the computing device 100 to cause the computing device 100 to perform the method 300. The computer-readable media may be embodied as any type of media capable of being read by the computing device 100 including, but not limited to, the memory 124, the data storage device 126, firmware devices, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for device initialization, the computing device comprising: an access manager to determine whether an upper part of a first control and status register (CSR) address matches a cached upper part of a previous CSR address; an address converter to, in response to a determination that the upper part of the first CSR address does not match the cached upper part of the previous CSR address: (i) convert the first CSR address to a physical address of a CSR of the computing device and (ii) cache the upper part of the first CSR address in the cached upper part of the previous CSR address and an upper part of the physical address in a cached upper part of a previous physical address; and a cache manager to, in response to a determination that the upper part of the first CSR address matches the cached upper part of the previous CSR address, combine the cached upper part of the previous physical address and a CSR offset of the first CSR address to generate the physical address; wherein the access manager is further to access the CSR of the computing device at the physical address.

Example 2 includes the subject matter of Example 1, and wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

Example 3 includes the subject matter of any of Examples 1 and 2, and further comprising a configuration manager to: start a firmware initialization phase; and access the CSR of the computing device at the first CSR address in response to a start of the firmware initialization phase; wherein to determine whether the upper part of the first CSR address matches the cached upper part of the previous CSR address comprises to determine whether the upper part of the first CSR address matches the cached upper part of the previous CSR address in response to an access of the CSR at the first CSR address.

Example 4 includes the subject matter of any of Examples 1-3, and wherein to start the firmware initialization phase comprises to execute a unified extensible firmware interface environment of the computing device.

Example 5 includes the subject matter of any of Examples 1-4, and wherein to convert the first CSR address to the physical address of the CSR comprises to call a CSR-to-physical-address conversion procedure.

Example 6 includes the subject matter of any of Examples 1-5, and wherein to convert the first CSR address to the physical address of the CSR comprises to: generate a PCIe address associated with the CSR; and add the PCIe address to a memory mapped configuration base address to generate the physical address of the CSR.

Example 7 includes the subject matter of any of Examples 1-6, and wherein the PCIe address comprises a bus identifier, a device identifier, a function identifier, and an offset.

Example 8 includes the subject matter of any of Examples 1-7, and wherein the PCIe address comprises an 8-bit bus identifier, a 5-bit device identifier, a 3-bit function identifier, and a 12-bit offset.

Example 9 includes the subject matter of any of Examples 1-8, and wherein to access the CSR of the computing device at the physical address comprises to access the CSR of the computing device at the physical address in response to a conversion of the first CSR address to the physical address or a combination of the cached upper part of the previous physical address and the CSR offset of the first CSR address to generate the physical address.

Example 10 includes the subject matter of any of Examples 1-9, and wherein the CSR comprises a configuration register of a hardware component of the computing device.

Example 11 includes the subject matter of any of Examples 1-10, and wherein the upper part of the first CSR address is associated with a CSR register category.

Example 12 includes the subject matter of any of Examples 1-11, and wherein to access the CSR of the computing device comprises to perform a memory-mapped I/O operation at the physical address.

Example 13 includes a method for device initialization, the method comprising: determining, by a computing device, whether an upper part of a first control and status register (CSR) address matches a cached upper part of a previous CSR address; in response to determining that the upper part of the first CSR address does not match the cached upper part of the previous CSR address: (i) converting, by the computing device, the first CSR address to a physical address of a CSR of the computing device and (ii) caching, by the computing device, the upper part of the first CSR address in the cached upper part of the previous CSR address and an upper part of the physical address in a cached upper part of a previous physical address; in response to determining that the upper part of the first CSR address matches the cached upper part of the previous CSR address, combining, by the computing device, the cached upper part of the previous physical address and a CSR offset of the first CSR address to generate the physical address; and accessing, by the computing device, the CSR of the computing device at the physical address.

Example 14 includes the subject matter of Example 13, and wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

Example 15 includes the subject matter of any of Examples 13 and 14, and further comprising: starting, by the computing device, a firmware initialization phase; and accessing, by the computing device, the CSR of the computing device at the first CSR address in response to starting the firmware initialization phase; wherein determining whether the upper part of the first CSR address matches the cached upper part of the previous CSR address comprises determining whether the upper part of the first CSR address matches the cached upper part of the previous CSR address in response to accessing the CSR at the first CSR address.

Example 16 includes the subject matter of any of Examples 13-15, and wherein starting the firmware initialization phase comprises executing a unified extensible firmware interface environment of the computing device.

Example 17 includes the subject matter of any of Examples 13-16, and wherein converting the first CSR address to the physical address of the CSR comprises calling a CSR-to-physical-address conversion procedure.

Example 18 includes the subject matter of any of Examples 13-17, and wherein converting the first CSR address to the physical address of the CSR comprises: generating a PCIe address associated with the CSR; and adding the PCIe address to a memory mapped configuration base address to generate the physical address of the CSR.

Example 19 includes the subject matter of any of Examples 13-18, and wherein generating the PCIe address comprises generating a bus identifier, a device identifier, a function identifier, and an offset.

Example 20 includes the subject matter of any of Examples 13-19, and wherein generating the PCIe address comprises generating an 8-bit bus identifier, a 5-bit device identifier, a 3-bit function identifier, and a 12-bit offset.

Example 21 includes the subject matter of any of Examples 13-20, and wherein accessing the CSR of the computing device at the physical address comprises accessing the CSR of the computing device at the physical address in response to converting the first CSR address to the physical address or combining the cached upper part of the previous physical address and the CSR offset of the first CSR address to generate the physical address.

Example 22 includes the subject matter of any of Examples 13-21, and wherein the CSR comprises a configuration register of a hardware component of the computing device.

Example 23 includes the subject matter of any of Examples 13-22, and wherein the upper part of the first CSR address is associated with a CSR register category.

Example 24 includes the subject matter of any of Examples 13-23, and wherein accessing the CSR of the computing device comprises performing a memory-mapped I/O operation at the physical address.

Example 25 includes a computing device comprising: a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for device initialization, the computing device comprising: means for determining whether an upper part of a first control and status register (CSR) address matches a cached upper part of a previous CSR address; means for converting the first CSR address to a physical address of a CSR of the computing device in response to determining that the upper part of the first CSR address does not match the cached upper part of the previous CSR address; means for caching the upper part of the first CSR address in the cached upper part of the previous CSR address and an upper part of the physical address in a cached upper part of a previous physical address in response to determining that the upper part of the first CSR address does not match the cached upper part of the previous CSR address; means for combining the cached upper part of the previous physical address and a CSR offset of the first CSR address to generate the physical address in response to determining that the upper part of the first CSR address matches the cached upper part of the previous CSR address; and means for accessing the CSR of the computing device at the physical address.

Example 29 includes the subject matter of Example 28, and wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

Example 30 includes the subject matter of any of Examples 28 and 29, and further comprising: means for starting a firmware initialization phase; and means for accessing the CSR of the computing device at the first CSR address in response to starting the firmware initialization phase; wherein the means for determining whether the upper part of the first CSR address matches the cached upper part of the previous CSR address comprises means for determining whether the upper part of the first CSR address matches the cached upper part of the previous CSR address in response to accessing the CSR at the first CSR address.

Example 31 includes the subject matter of any of Examples 28-30, and wherein the means for starting the firmware initialization phase comprises means for executing a unified extensible firmware interface environment of the computing device.

Example 32 includes the subject matter of any of Examples 28-31, and wherein the means for converting the first CSR address to the physical address of the CSR comprises means for calling a CSR-to-physical-address conversion procedure.

Example 33 includes the subject matter of any of Examples 28-32, and wherein the means for converting the first CSR address to the physical address of the CSR comprises: means for generating a PCIe address associated with the CSR; and means for adding the PCIe address to a memory mapped configuration base address to generate the physical address of the CSR.

Example 34 includes the subject matter of any of Examples 28-33, and wherein the means for generating the PCIe address comprises means for generating a bus identifier, a device identifier, a function identifier, and an offset.

Example 35 includes the subject matter of any of Examples 28-34, and wherein the means for generating the PCIe address comprises means for generating an 8-bit bus identifier, a 5-bit device identifier, a 3-bit function identifier, and a 12-bit offset.

Example 36 includes the subject matter of any of Examples 28-35, and wherein the means for accessing the CSR of the computing device at the physical address comprises means for accessing the CSR of the computing device at the physical address in response to converting the first CSR address to the physical address or combining the cached upper part of the previous physical address and the CSR offset of the first CSR address to generate the physical address.

Example 37 includes the subject matter of any of Examples 28-36, and wherein the CSR comprises a configuration register of a hardware component of the computing device.

Example 38 includes the subject matter of any of Examples 28-37, and wherein the upper part of the first CSR address is associated with a CSR register category.

Example 39 includes the subject matter of any of Examples 28-38, and wherein the means for accessing the CSR of the computing device comprises means for performing a memory-mapped I/O operation at the physical address.

The invention claimed is:

1. A computing device for device initialization, the computing device comprising:
an access manager circuitry to determine whether an upper part of a first control and status register (CSR) address matches a cached upper part of a previous CSR address;
an address converter circuitry to, in response to a determination that the upper part of the first CSR address does not match the cached upper part of the previous CSR address: (i) convert the first CSR address to a physical address of a CSR of the computing device and (ii) cache the upper part of the first CSR address in the cached upper part of the previous CSR address and an upper part of the physical address in a cached upper part of a previous physical address; and
a cache manager circuitry to, in response to a determination that the upper part of the first CSR address matches the cached upper part of the previous CSR address, combine the cached upper part of the previous physical address and a CSR offset of the first CSR address to generate the physical address;
wherein the access manager circuitry is further to access the CSR of the computing device at the physical address.

2. The computing device of claim 1, wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

3. The computing device of claim 1, further comprising a configuration manager circuitry to:
start a firmware initialization phase; and
access the CSR of the computing device at the first CSR address in response to a start of the firmware initialization phase;
wherein to determine whether the upper part of the first CSR address matches the cached upper part of the previous CSR address comprises to determine whether the upper part of the first CSR address matches the cached upper part of the previous CSR address in response to an access of the CSR at the first CSR address.

4. The computing device of claim 3, wherein to start the firmware initialization phase comprises to execute a unified extensible firmware interface environment of the computing device.

5. The computing device of claim 1, wherein to convert the first CSR address to the physical address of the CSR comprises to call a CSR-to-physical-address conversion procedure.

6. The computing device of claim 1, wherein to convert the first CSR address to the physical address of the CSR comprises to:
generate a PCIe address associated with the CSR; and
add the PCIe address to a memory mapped configuration base address to generate the physical address of the CSR.

7. The computing device of claim 6, wherein the PCIe address comprises a bus identifier, a device identifier, a function identifier, and an offset.

8. The computing device of claim 1, wherein to access the CSR of the computing device at the physical address comprises to access the CSR of the computing device at the physical address in response to a conversion of the first CSR address to the physical address or a combination of the cached upper part of the previous physical address and the CSR offset of the first CSR address to generate the physical address.

9. The computing device of claim 1, wherein the CSR comprises a configuration register of a hardware component of the computing device.

10. The computing device of claim 1, wherein the upper part of the first CSR address is associated with a CSR register category.

11. The computing device of claim 1, wherein to access the CSR of the computing device comprises to perform a memory-mapped I/O operation at the physical address.

12. A method for device initialization, the method comprising:
   determining, by a computing device, whether an upper part of a first control and status register (CSR) address matches a cached upper part of a previous CSR address;
   in response to determining that the upper part of the first CSR address does not match the cached upper part of the previous CSR address: (i) converting, by the computing device, the first CSR address to a physical address of a CSR of the computing device and (ii) caching, by the computing device, the upper part of the first CSR address in the cached upper part of the previous CSR address and an upper part of the physical address in a cached upper part of a previous physical address;
   in response to determining that the upper part of the first CSR address matches the cached upper part of the previous CSR address, combining, by the computing device, the cached upper part of the previous physical address and a CSR offset of the first CSR address to generate the physical address; and
   accessing, by the computing device, the CSR of the computing device at the physical address.

13. The method of claim 12, wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

14. The method of claim 12, further comprising:
   starting, by the computing device, a firmware initialization phase; and
   accessing, by the computing device, the CSR of the computing device at the first CSR address in response to starting the firmware initialization phase;
   wherein determining whether the upper part of the first CSR address matches the cached upper part of the previous CSR address comprises determining whether the upper part of the first CSR address matches the cached upper part of the previous CSR address in response to accessing the CSR at the first CSR address.

15. The method of claim 12, wherein converting the first CSR address to the physical address of the CSR comprises calling a CSR-to-physical-address conversion procedure.

16. The method of claim 12, wherein converting the first CSR address to the physical address of the CSR comprises:
   generating a PCIe address associated with the CSR; and
   adding the PCIe address to a memory mapped configuration base address to generate the physical address of the CSR.

17. The method of claim 12, wherein accessing the CSR of the computing device at the physical address comprises accessing the CSR of the computing device at the physical address in response to converting the first CSR address to the physical address or combining the cached upper part of the previous physical address and the CSR offset of the first CSR address to generate the physical address.

18. One or more non-transitory, computer-readable storage media comprising a plurality of instructions that in response to being executed cause a computing device to
   determine whether an upper part of a first control and status register (CSR) address matches a cached upper part of a previous CSR address;
   in response to determining that the upper part of the first CSR address does not match the cached upper part of the previous CSR address: (i) convert the first CSR address to a physical address of a CSR of the computing device and (ii) cache the upper part of the first CSR address in the cached upper part of the previous CSR address and an upper part of the physical address in a cached upper part of a previous physical address;
   in response to determining that the upper part of the first CSR address matches the cached upper part of the previous CSR address, combine the cached upper part of the previous physical address and a CSR offset of the first CSR address to generate the physical address; and
   access the CSR of the computing device at the physical address.

19. The one or more non-transitory, computer-readable storage media of claim 18, wherein the first CSR address comprises a 20-bit upper part and a 12-bit CSR offset and the physical address comprises a 20-bit upper part and a 12-bit physical offset, wherein the 12-bit CSR offset matches the 12-bit physical offset.

20. The one or more non-transitory, computer-readable storage media of claim 18, further comprising a plurality of instructions that in response to being executed cause the computing device to:
   start a firmware initialization phase; and
   access the CSR of the computing device at the first CSR address in response to starting the firmware initialization phase;
   wherein to determine whether the upper part of the first CSR address matches the cached upper part of the previous CSR address comprises to determine whether the upper part of the first CSR address matches the cached upper part of the previous CSR address in response to accessing the CSR at the first CSR address.

21. The one or more non-transitory, computer-readable storage media of claim 18, wherein to convert the first CSR address to the physical address of the CSR comprises to call a CSR-to-physical-address conversion procedure.

22. The one or more non-transitory, computer-readable storage media of claim 18, wherein to convert the first CSR address to the physical address of the CSR comprises to:
   generate a PCIe address associated with the CSR; and
   add the PCIe address to a memory mapped configuration base address to generate the physical address of the CSR.

23. The one or more non-transitory, computer-readable storage media of claim 18, wherein to access the CSR of the computing device at the physical address comprises to access the CSR of the computing device at the physical address in response to converting the first CSR address to the physical address or combining the cached upper part of the previous physical address and the CSR offset of the first CSR address to generate the physical address.

* * * * *